(12) United States Patent
Tsuji et al.

(10) Patent No.: US 7,671,725 B2
(45) Date of Patent: Mar. 2, 2010

(54) VEHICLE SURROUNDINGS MONITORING APPARATUS, VEHICLE SURROUNDINGS MONITORING METHOD, AND VEHICLE SURROUNDINGS MONITORING PROGRAM

(75) Inventors: Takayuki Tsuji, Wako (JP); Nobuharu Nagaoka, Wako (JP); Yoichi Sugimoto, Wako (JP); Morimichi Nishigaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 575 days.

(21) Appl. No.: 11/717,565

(22) Filed: Mar. 13, 2007

(65) Prior Publication Data
US 2007/0222566 A1 Sep. 27, 2007

(30) Foreign Application Priority Data
Mar. 24, 2006 (JP) ............................. 2006-082956
Apr. 3, 2006 (JP) ............................. 2006-101838

(51) Int. Cl.
*B60Q 1/00* (2006.01)
(52) U.S. Cl. ...................................... 340/435; 340/944
(58) Field of Classification Search ................. 340/435, 340/944, 470
See application file for complete search history.

(56) References Cited
U.S. PATENT DOCUMENTS
2005/0073437 A1* 4/2005 Perri .......................... 340/944

FOREIGN PATENT DOCUMENTS
| JP | 2001-006096 | 1/2001 |
|---|---|---|
| JP | 2002-272796 A | 9/2002 |
| JP | 2003-016458 | 1/2003 |
| JP | 2003-284057 | 10/2003 |
| JP | 2004-303251 | 10/2004 |
| JP | 2005-165422 | 6/2005 |
| JP | 2005-271745 | 10/2005 |

* cited by examiner

*Primary Examiner*—Daniel Wu
*Assistant Examiner*—Shirley Lu
(74) *Attorney, Agent, or Firm*—Carrier, Blackman & Associates PC; Joseph P. Carrier; William D. Blackman

(57) ABSTRACT

A vehicle surroundings monitoring apparatus, a vehicle surroundings monitoring method, and a vehicle surroundings monitoring program which can rapidly determine an object such as a pedestrian to be avoided which must be avoided from coming into contact with the vehicle from an image of the surroundings of the vehicle and can provide information to a driver or control the vehicle behaviors. The vehicle surroundings monitoring apparatus includes an object extraction process unit (11) which extracts objects existing around a vehicle (10) from images taken by infrared cameras (2R, 2L), a pedestrian extraction process unit (12) which extracts a pedestrian from the extracted objects, a posture determination process unit (13) which determines the posture of the extracted pedestrian, an object-to-be-avoided determination process unit (14) which determines whether the extracted object is an object to be avoided which must be avoided from coming into contact with the vehicle (10) by executing a determination algorithm including at least a first determination process on the posture of the pedestrian determined by the posture determination process unit (13), and a vehicle equipment control process unit (15) which controls equipment of the vehicle (10) at least according to the determination result of the object-to-be-avoided determination process unit (14).

13 Claims, 9 Drawing Sheets

L1: (x3, y3, 2)
L2: (x4, y4, 2)
L3: (x3, y5, 3)
L4: (x7, y3, 8)
L5: (x8, y4, 7)
L6: (x9, y5, 8)
L7: (x9, y6, 8)
L8: (x8, y7, 8)

L1: (x3, y3, 2, 1)
L2: (x4, y4, 2, 1)
L3: (x3, y5, 3, 1)
L4: (x7, y3, 8, 2)
L5: (x8, y4, 7, 2)
L6: (x9, y5, 8, 2)
L7: (x9, y6, 8, 2)
L8: (x8, y7, 8, 2)
           ↑
      OBJECT LABEL

VEHICLE SURROUNDINGS MONITORING APPARATUS, VEHICLE SURROUNDINGS MONITORING METHOD, AND VEHICLE SURROUNDINGS MONITORING PROGRAM

BACKGROUND OF THE INVENTION

1. Field of the Invention

The present invention relates to a vehicle surroundings monitoring apparatus, a vehicle surroundings monitoring method, and a vehicle surroundings monitoring program which monitor the surroundings of a vehicle based on an image taken by a camera mounted on a vehicle.

2. Description of the Related Art

In recent years, there has been known a technology of taking an image of the surroundings of a vehicle with a camera such as a CCD camera mounted thereon, determining an object such as a pedestrian likely to come in contact with the vehicle by detecting the position of the object such as the pedestrian existing around the vehicle based on the taken image, and providing a driver with the information (for example, refer to Japanese Patent Laid-Open No. 2001-6096 (hereinafter, referred to as Patent Document 1)).

In the vehicle surroundings monitoring apparatus in Patent Document 1, a stereoscopic camera consisting of two infrared cameras is mounted on a vehicle and a relative position of an object existing around the vehicle with respect to the vehicle is detected as position data on the basis of a difference (parallax) between images taken by the two infrared cameras. Thereafter, a movement vector of the object relative to the vehicle is calculated based on time series data of the object position and the object likely to come in contact with the vehicle is determined based on the position data and the movement vector of the object.

In this determination, the vehicle surroundings monitoring apparatus sets a close object determination area AR1 corresponding to a road on which the vehicle is traveling and approaching object determination areas AR2 and AR3 located on the outside in the lateral direction of the close object determination area AR1 in a calling attention determination area which is within a predetermined distance in front of the vehicle (corresponding to an area determined according to a relative speed of the object with respect to the vehicle). In the case where the object exists in the close object determination area AR1, the object is a pedestrian or the like on the road and the object is determined to be likely to come in contact with the vehicle. Furthermore, in the case where the object exists in the approaching object determination area AR2 or AR3, the object is a pedestrian or the like on the roadside. Therefore, the approaching object contact determination is made based on the movement vector of the object to determine whether there is a possibility of contact between the object and the vehicle. Thereby, a pedestrian normally walking on the roadside is determined to be unlikely to come in contact with the vehicle, while a pedestrian moving to cross the road from the roadside is determined to be likely to come in contact with the vehicle and appropriate information is provided to the driver.

On the other hand, for example, a pedestrian on the roadside may suddenly run into the road. In that case, it is desirable that the driver is provided with information or vehicle behaviors are controlled as rapidly as possible. In the vehicle surroundings monitoring apparatus in Patent Document 1, however, the possibility of contact between the vehicle and the object existing in the approaching object determination area is determined based on the movement vector calculated from a plurality of time series position data, which requires a long time to determine that the object is likely to come in contact with the vehicle. Therefore, in the case where the pedestrian on the roadside suddenly runs into the road, the apparatus cannot rapidly provide the driver with the information or control the vehicle behaviors disadvantageously.

SUMMARY OF THE INVENTION

It is an object of the present invention to provide a vehicle surroundings monitoring apparatus capable of solving the above problem and providing a driver with information or controlling vehicle behaviors by rapidly determining a pedestrian which is an object to be avoided which must be avoided from coming into contact with the vehicle from an image of the surroundings of the vehicle.

To achieve the above object, according to a first aspect of the present invention, there is provided a vehicle surroundings monitoring apparatus which monitors the surroundings of a vehicle from an image taken by a camera mounted on the vehicle, comprising: an object extraction process unit which extracts an object existing around the vehicle from the image taken by the camera; a pedestrian extraction process unit which extracts a pedestrian from the object extracted by the object extraction process unit; a posture determination process unit which determines the posture of the pedestrian extracted by the pedestrian extraction process unit; an object-to-be-avoided determination process unit which determines whether the object extracted by the object extraction process unit is an object to be avoided which must be avoided from coming into contact with the vehicle by executing a determination algorithm including at least a first determination process on the posture of the pedestrian determined by the posture determination process unit; and a vehicle equipment control process unit which controls equipment of the vehicle at least according to a determination result of the object-to-be-avoided determination process unit (First invention).

In the vehicle surroundings monitoring apparatus according to the first invention, the object extraction process unit extracts the object existing around the vehicle from the image taken by the camera and the pedestrian extraction process unit extracts the pedestrian from the object. In the case where the pedestrian on the roadside suddenly runs into the road, there is a need to provide the driver with information such as calling driver's attention or the like or to control the vehicle behaviors as rapidly as possible. Therefore, it is required to rapidly predict in advance that the pedestrian will cross the road. In this situation, generally it is considered that the pedestrian going to cross the road differs from other pedestrians in posture on the direction or inclination of the body at the time point where they are on the roadside. For example, in the case where the pedestrian starts to move or is going to run into the road, his trunk axis inclines in the moving direction. On the other hand, in the case where the pedestrian stops or continues to move along with the road, his trunk axis inclines at a sufficiently small angle.

Therefore, the posture determination process unit determines the posture of the pedestrian from the image taken by the camera. It is possible to predict the pedestrian's behavior such as, for example, crossing the road rapidly in advance from the posture of the pedestrian determined as described above. Since the determination algorithm executed by the object-to-be-avoided determination process unit includes the first determination process of the posture of the pedestrian, the object-to-be-avoided determination process unit can rapidly determine a determination result when determining whether the object is the object to be avoided which must be avoided from coming into contact with the vehicle. Therefore, the vehicle equipment control process unit controls the equipment of the vehicle according to the determination result of the object-to-be-avoided determination process unit, by which the vehicle equipment can be rapidly controlled so as to cope with the object to be avoided.

Furthermore, in the vehicle surroundings monitoring apparatus according to the first invention, preferably the equipment controlled by the vehicle equipment control process unit includes a device capable of calling attention of a driver of the vehicle (Second invention).

According thereto, the object-to-be-avoided determination process unit can rapidly determine whether the object is the object to be avoided. Therefore, the vehicle equipment control process unit can rapidly perform the calling driver's attention so as to cope with the object to be avoided (call the driver's attention to the object).

Furthermore, in the vehicle surroundings monitoring apparatus according to the first or second invention, the equipment controlled by the vehicle equipment control process unit preferably includes a device capable of controlling traveling behaviors of the vehicle (Third invention).

According thereto, the object-to-be-avoided determination process unit can rapidly determine whether the object is the object to be avoided and therefore the vehicle equipment control process unit can rapidly control the traveling behaviors of the vehicle so as to cope with the object to be avoided.

Furthermore, where the vehicle surroundings monitoring apparatus according to one of the first to third inventions comprises: a relative position detection process unit which sequentially detects relative positions of the object extracted by the object extraction process unit to the vehicle; and a moving direction feature value calculation process unit which calculates a moving direction feature value representing a moving direction of the object relative to the vehicle based on the time series of the relative position of the object detected by the relative position detection process unit at longer time intervals than the execution period of the determination process of the posture determination process unit, the determination algorithm which is executed by the object-to-be-avoided determination process unit includes a second determination process on the moving direction feature value of the object calculated by the moving direction feature value calculation process unit as well as the first determination process; the first determination process is performed to determine whether the posture of the pedestrian satisfies a predetermined first requirement; and the second determination process is performed to determine whether the moving direction feature value of the object satisfies a predetermined second requirement, and the object-to-be-avoided determination process unit determines that the object is the object to be avoided when the determination result of the second determination process on the moving direction feature value of the object satisfies the second requirement or when the determination result of the second determination process does not satisfy the second requirement and further the determination result of the first determination process on the posture of the pedestrian satisfies the first requirement (Fourth invention).

According thereto, the determination algorithm executed by the object-to-be-avoided determination process unit includes the second determination process on the moving direction feature value and therefore it provides a very reliable determination result. The moving direction feature value, however, is calculated at longer time intervals than the execution period of the posture determination process of the posture determination process unit, and therefore it takes long time to obtain the determination result of the object-to-be-avoided determination process unit. On the other hand, the determination algorithm executed by the object-to-be-avoided determination process unit also includes the first determination process on the posture of the pedestrian and therefore it is possible to obtain the determination result rapidly. Therefore, the object-to-be-avoided determination process unit determines that the object is the object to be avoided when the determination result of the second determination process on the moving direction feature value of the object satisfies the second requirement or when the determination result of the second determination process does not satisfy the second requirement and further the determination result of the first determination process on the posture of the pedestrian satisfies the first requirement.

According thereto, when the reliable determination result based on the moving direction feature value is achieved, the object-to-be-avoided determination process unit can determine whether the object is the object to be avoided according to the determination result and, for example, in the case of insufficient time for calculating the moving direction feature value, it can determine whether the object is the object to be avoided according to the rapid determination result based on the posture of the pedestrian. Therefore, it is possible to determine more reliably whether the object is the object to be avoided which must be avoided from coming into contact with the vehicle.

The second requirement is, for example, that the object moving direction is a direction in which the object moves toward the subject vehicle. The first requirement is, for example, that the object is a pedestrian and the posture of the pedestrian is leaning forward toward the center of the traffic lane in which the subject vehicle is traveling.

Furthermore, in the vehicle surroundings monitoring apparatus according to the fourth invention, preferably the vehicle equipment control process unit controls the vehicle equipment in different modes between when the determination result of the second determination process on the moving direction feature value of the object satisfies the second requirement and when the determination result of the second determination process does not satisfy the second requirement and further the determination result of the first determination process on the posture of the pedestrian satisfies the first requirement (Fifth invention)

More specifically, the reliability of the final determination result or the emergency level of avoidance determined by the object-to-be-avoided determination process unit vary between when the determination result of the second determination process on the moving direction feature value of the object satisfies the second requirement and when the determination result of the second determination process does not satisfy the second requirement and further the determination result of the first determination process on the posture of the pedestrian satisfies the first requirement. Therefore, the vehicle equipment control process unit controls the vehicle equipment in a different mode in each case, thereby enabling more appropriate provision of information to the driver and control of vehicle behaviors.

For example, in the case where the equipment controlled by the vehicle equipment control process unit is capable of calling the vehicle driver's attention, the vehicle equipment control process unit can call the driver's attention in a different way of calling attention in each case.

Furthermore, in the vehicle surroundings monitoring apparatus according to one of the first to fifth inventions, preferably the posture determination process unit determines a degree of symmetry of the pedestrian in the vehicle width direction in the image with the symmetry considered as a feature value representing the posture of the pedestrian (Sixth invention).

More specifically, generally the posture of the pedestrian who is going to cross the road leans forward toward the center of the lane in which the vehicle is traveling. In this situation, the degree of symmetry is thought to be relatively low between the portions near and opposite to the center of the lane in the area corresponding to the pedestrian with the center located at the head of the pedestrian in the image taken by the camera mounted on the vehicle. In other words, the symmetry of the pedestrian in the vehicle width direction in the image is a feature value closely related to whether the pedestrian is in a posture to be going to cross the road (whether the pedestrian is leaning forward). Therefore, it is found by using the degree of symmetry that, for example, the pedestrian is leaning forward toward the center of the lane in which the vehicle is traveling, by which the pedestrian's behavior such as crossing the road can be rapidly predicted. Accordingly, the object-to-be-avoided determination process unit determines whether the pedestrian is an object to be avoided according to the degree of symmetry determined by the posture determination process unit in the first determination process, by which it is possible to rapidly predict the pedestrian's behavior such as crossing the road and to thereby rapidly determine whether the pedestrian is the object to be avoided which must be avoided from coming into contact with the vehicle.

Alternatively, in the vehicle surroundings monitoring apparatus according to one of the first to fifth inventions, preferably the posture determination process unit determines a degree of tilt of a trunk axis of the pedestrian with the tilt of the trunk axis considered as a feature value representing the posture of the pedestrian (Seventh invention).

Specifically, the tilt of the trunk axis (the direction or angle of the trunk axis) of the pedestrian is a feature value representing the posture regarding the tilt of the trunk axis of the pedestrian and the degree of the tilt indicates, for example, whether the pedestrian is leaning forward toward the center of the lane in which the vehicle is traveling. In this situation, the pedestrian who is going to cross the road is generally leaning forward toward the center of the lane in which the vehicle is traveling (the posture in which the trunk axis of the pedestrian is leaning forward toward the center of the lane in which the vehicle is traveling). Therefore, the pedestrian's behavior such as crossing the road can be rapidly predicted from the degree of tilt of the trunk axis. Accordingly, the object-to-be-avoided determination process unit determines whether the pedestrian is the object to be avoided according to the degree of tilt of the trunk axis determined by the posture determination process unit in the first determination process, by which it is possible to rapidly predict the pedestrian's behavior such as crossing the road and to thereby rapidly determine whether the pedestrian is the object to be avoided which must be avoided from coming into contact with the vehicle.

Furthermore, preferably the vehicle surroundings monitoring apparatus according to one of the first to fifth inventions further comprises: a binarization process unit which extracts a binary area, in which the luminance value of a pixel in the image is equal to or higher than a predetermined threshold value, by binarizing the image taken by the camera; and a run length data creation process unit which creates run length data of the binary area extracted by the binarization process unit, and the object extraction process unit extracts an object existing around the road based on the run length data created by the run length data creation process unit and the posture determination process unit determines the posture of the pedestrian extracted by the pedestrian extraction process unit based on the run length data created by the run length data creation process unit (Eighth invention).

According thereto, the posture determination process unit determines the posture of the extracted pedestrian based on the run length data. In this process, the point sequence data of a predetermined point (for example, a midpoint) on each line of the run length data closely relates to the tilt of the trunk axis of the pedestrian. Therefore, the run length data can be used to determine the posture of the pedestrian regarding the tilt of the trunk axis. Thereafter, for example, the pedestrian's behavior such as crossing the road can be rapidly predicted in advance from the posture of the pedestrian determined as described above. The run length data can be calculated from only a single-frame image in the above. Therefore, it takes a shorter time to determine the posture than the determination based on the time-series data or the like of the image, for example. In addition, the run length data is calculated in the process of extracting the pedestrian from the image, and the computational load necessary to determine the posture is reduced by using the run length data for the determination. Therefore, it is possible to easily and rapidly determine the posture of the pedestrian with a simple process by using the posture determination process unit.

Furthermore, in the vehicle surroundings monitoring apparatus according to the eighth invention, preferably the posture determination process unit includes: a process unit which calculates point sequence data consisting of pixel coordinates of midpoints of respective lines of the run length data from the run length data created by the run length data creation process unit; a process unit which calculates an approximate straight line approximate to the calculated point sequence data; and a process unit which determines the posture of the pedestrian based on the calculated approximate straight line (Ninth invention).

According thereto, the posture determination process unit calculates the point sequence data consisting of the pixel coordinates of the midpoints of the respective lines in the run length data and calculates the approximate straight line approximate to the point sequence data. In this process, the calculated approximate straight line corresponds to the trunk axis of the pedestrian. Therefore, the posture determination process unit determines the posture of the pedestrian based on the approximate straight line, by which the posture of the pedestrian (the posture regarding the tilt of the trunk axis of the pedestrian) can be determined easily and rapidly.

More specifically, in the vehicle surroundings monitoring apparatus according to the ninth invention, the posture determination process unit determines the posture of the pedestrian based on an angle between the approximate straight line and a vertical axis in the image (10th invention).

In other words, the approximate straight line may correspond to the trunk axis of the pedestrian and therefore the direction and angle of the tilt of the trunk axis of the pedestrian can be known from the angle between the approximate straight line and the vertical axis. Then, the pedestrian's behavior such as, for example, crossing the road can be rapidly predicted in advance from the posture of the pedestrian (the posture regarding the tilt of the trunk axis of the pedestrian) determined as described above.

Subsequently, according to a second aspect of the present invention, there is provided a vehicle surroundings monitoring apparatus having a computer including an interface circuit for accessing data of an image taken by a camera mounted on a vehicle, the apparatus monitoring the surroundings of the vehicle by arithmetic processing with the computer, wherein the computer performs: an object extraction process of extracting an object existing around the vehicle from the image taken by the camera; a pedestrian extraction process of extracting a pedestrian from the object extracted in the object extraction process; a posture determination process of determining the posture of the pedestrian extracted in the pedestrian extraction process; an object-to-be-avoided determination process of determining whether the object extracted in the object extraction process is an object to be avoided which must be avoided from coming into contact with the vehicle by executing a determination algorithm including at least a first determination process on the posture of the pedestrian determined in the posture determination process; and a vehicle equipment control process of controlling equipment of the vehicle at least according to a determination result of the object-to-be-avoided determination process (11th invention).

According to the vehicle surroundings monitoring apparatus of the second aspect of the invention, the arithmetic processing of the computer produces the effects described regarding the vehicle surroundings monitoring apparatus of the first invention.

Subsequently, according to the present invention, there is provided a vehicle surroundings monitoring method for monitoring the surroundings of a vehicle from an image taken by a camera mounted on the vehicle, comprising: an object extraction step of extracting an object existing around the vehicle from the image taken by the camera; a pedestrian extraction step of extracting a pedestrian from the object extracted in the object extraction step; a posture determination step of determining the posture of the pedestrian extracted in the pedestrian extraction step; an object-to-be-avoided determination step of determining whether the object extracted in the object extraction step is an object to be avoided which must be avoided from coming into contact with the vehicle by executing a determination algorithm including at least a first determination process on the posture of the pedestrian determined in the posture determination step; and a vehicle equipment control step of controlling equipment of the vehicle at least according to a determination result of the object-to-be-avoided determination step (12th invention).

According to the vehicle surroundings monitoring method, the pedestrian's behavior such as, for example, crossing the road can be rapidly predicted in advance from the posture of the pedestrian determined in the posture determination step as described regarding the vehicle surroundings monitoring apparatus according to the first invention. The determination algorithm executed in the object-to-be-avoided determination step includes the first determination process on the posture of the pedestrian. Therefore, in the object-to-be-avoided determination step, the determination result can be rapidly determined when it is determined whether the object is an object to be avoided which must be avoided from coming into contact with the vehicle. Therefore, the vehicle equipment is controlled according to the determination result of the object-to-be-avoided determination step in the vehicle equipment control step, by which the vehicle equipment can be rapidly controlled so as to cope with the object to be avoided.

Subsequently, according to the present invention, there is provided a vehicle surroundings monitoring program for causing a computer to perform processing of monitoring the surroundings of a vehicle from an image taken by a camera mounted on the vehicle, the program causing the computer to perform: an object extraction process of extracting objects existing around the vehicle from the image taken by the camera; a pedestrian extraction process of extracting a pedestrian from the objects extracted in the object extraction process; a posture determination process of determining the posture of the pedestrian extracted in the pedestrian extraction process; an object-to-be-avoided determination process of determining whether the object extracted in the object extraction process is an object to be avoided which must be avoided from coming into contact with the vehicle by executing a determination algorithm including at least a first determination process on the posture of the pedestrian determined in the posture determination process; and a vehicle equipment control process of controlling equipment of the vehicle at least according to a determination result of the object-to-be-avoided determination process (13th invention).

According to the vehicle surroundings monitoring program, it is possible to cause the computer to perform the processes that produce the effects described regarding the vehicle surroundings monitoring apparatus according to the first invention.

DETAILED DESCRIPTION OF THE PREFERRED EMBODIMENTS

First Embodiment

First, a first embodiment of the present invention will be described with reference to FIG. 1 to FIG. 8.

Figure 1:
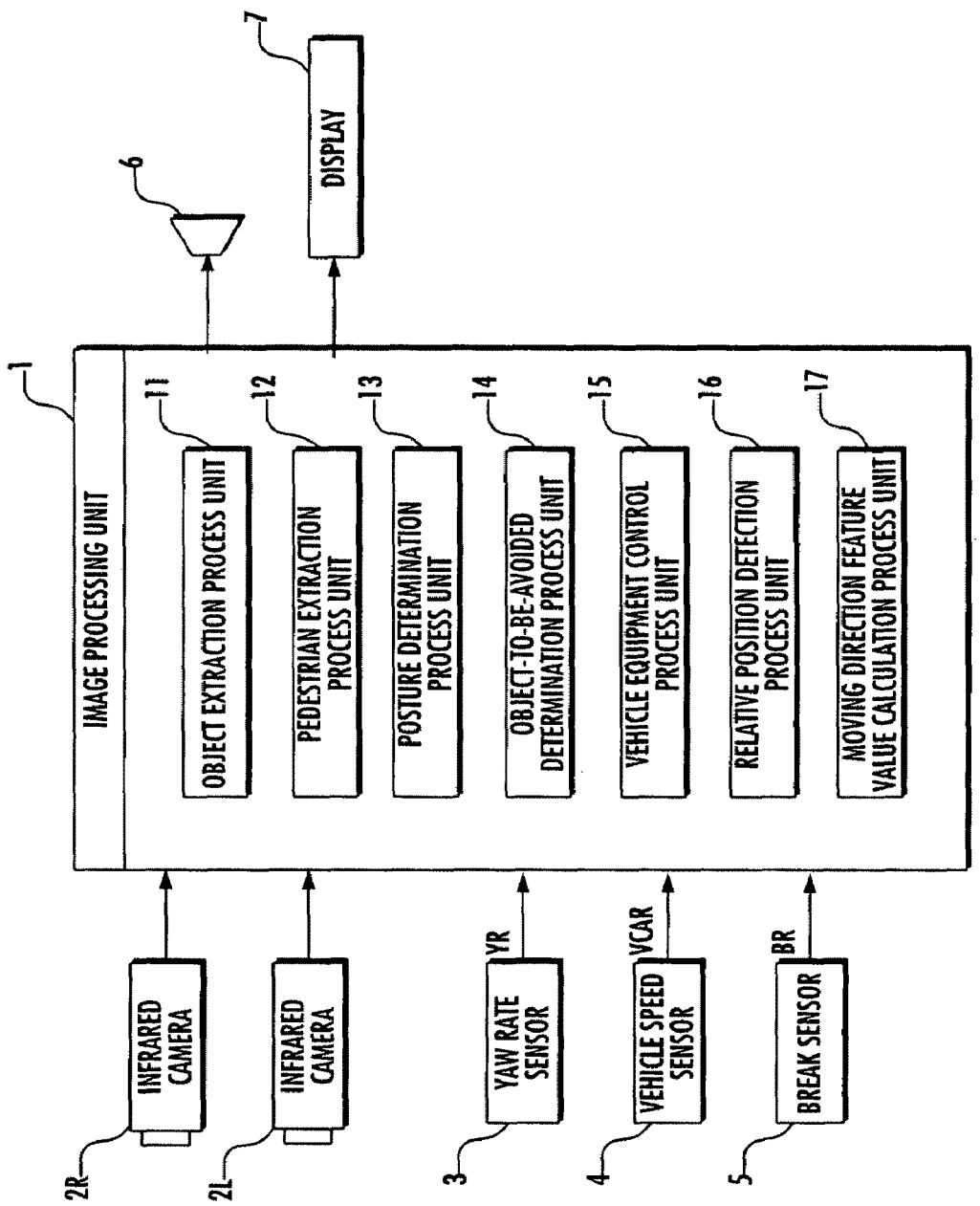
FIG. 1 is a functional block diagram of a vehicle surroundings monitoring apparatus of a first embodiment of the present invention.
Figure 2:
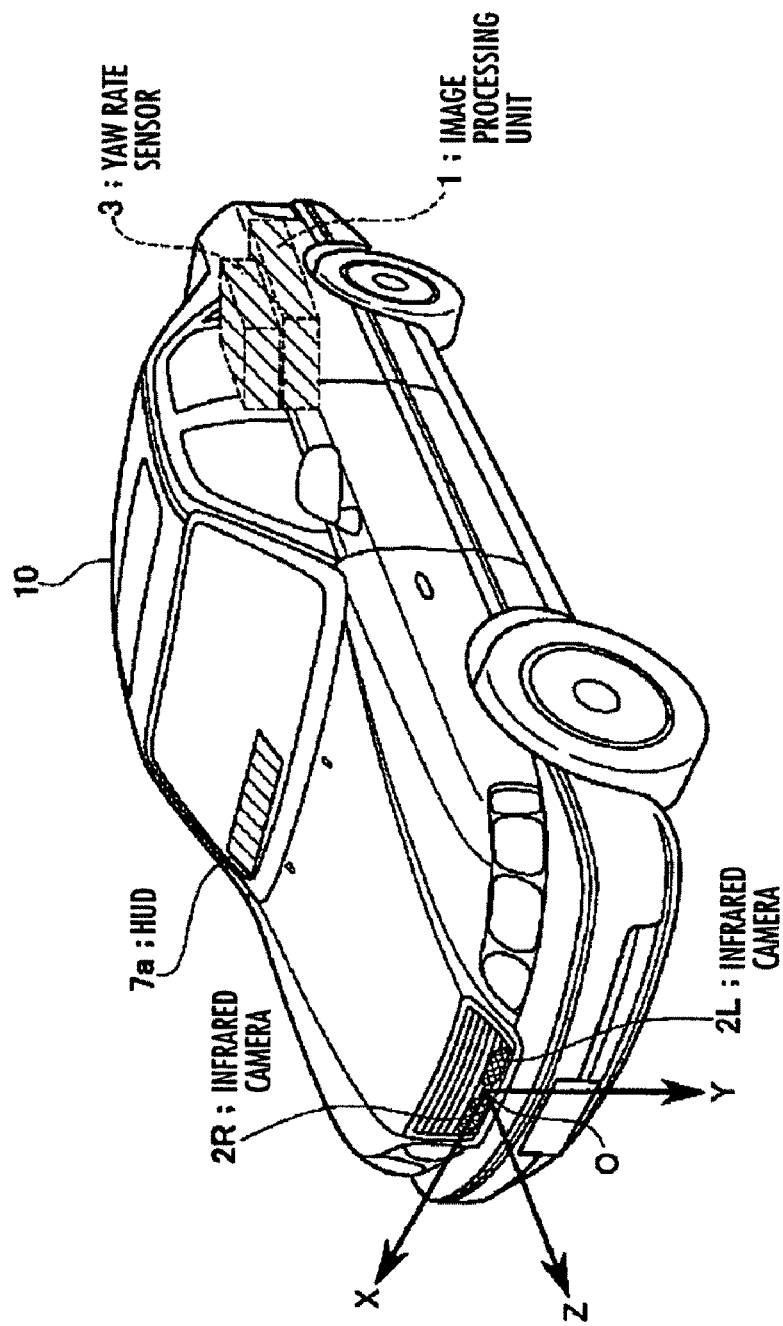
FIG. 2 is an explanatory diagram showing a state where the vehicle surroundings monitoring apparatus shown in FIG. 1 is mounted on a vehicle.

Referring to FIG. 1 and FIG. 2, a vehicle surroundings monitoring apparatus according to this embodiment is mounted on a vehicle 10 and includes an image processing unit 1 which is an electronic unit. The image processing unit 1 is connected to two infrared cameras 2R and 2L mounted on the vehicle 10, a yaw rate sensor 3 which detects a yaw rate of the vehicle 10, a vehicle speed sensor 4 which detects a traveling speed (vehicle speed) of the vehicle 10, and a brake sensor 5 which detects a brake operation of the vehicle 10.

In addition, the image processing unit 1 is connected to a loudspeaker 6 for use in outputting audible information calling for attention with voice or the like and to a display 7 for use in displaying images taken by the infrared cameras 2R and 2L and visual information calling for attention, which are provided in the vehicle surroundings monitoring apparatus. The display 7 includes, for example, a head up display (HUD) 7a which displays an image or other information on the front window of the vehicle 10. The HUD 7a is provided in such a way that the screen is displayed at a position on the front window of the vehicle 10 where the field of front vision of the driver is not impaired.

The infrared cameras 2R and 2L can detect a far infrared ray, each having a characteristic that the output signal level become higher (the luminance increases) as the temperature of an object rises. The infrared cameras 2R and 2L each correspond to the camera in the present invention.

As shown in FIG. 2, the infrared cameras 2R and 2L are located on the right side and the left side of the front part of the vehicle 10, respectively, so as to be substantially symmetric with respect to the center of the vehicle 10 in the vehicle width direction. The infrared cameras 2R and 2L are fixed to the vehicle 10 in such a way that the optical axes of the two infrared cameras 2R and 2L are parallel to each other and that both are at the same height from the road surface.

Although a detailed illustration is omitted here, the image processing unit 1 includes an A/D converter which converts an input analog signal to a digital signal, an image memory which stores a digitized image signal, and a computer (an arithmetic processing circuit including a CPU, a memory, I/O circuits and the like or a microcomputer in which these functions are collected intensively) which has an interface circuit for accessing (reading and writing) data stored in the image memory so as to perform various arithmetic processing operations for the image stored in the image memory. The image processing unit 1 converts output signals from the infrared cameras 2R and 2L, the yaw rate sensor 3, the vehicle speed sensor 4, and the brake sensor 5 to digital signals and inputs them to the computer.

The image processing unit 1 then performs a process of detecting an object such as a pedestrian based on the input data or a process of determining whether a requirement of the detected object is satisfied and calling driver's attention through the loudspeaker 6 or the display 7 in the case where the requirement is satisfied.

More specifically, the image processing unit 1 includes, as functions thereof, an object extraction process unit 11 which extracts an object existing around the vehicle 10 from the obtained image, a pedestrian extraction process unit 12 which extracts a pedestrian from the extracted object, a posture determination process unit 13 which determines the posture of the extracted pedestrian, an object-to-be-avoided determination process unit 14 which determines whether the object is an object to be avoided which must be avoided from coming into contact with the vehicle 10, and a vehicle equipment control process unit 15 which controls equipment of the vehicle 10 according to the determination result of the object-to-be-avoided determination process unit 14. In addition, the image processing unit 1 includes, as functions thereof, a relative position detection process unit 16 which sequentially detects relative position of the object with respect to the vehicle 10 and a moving direction feature value calculation process unit 17 which calculates a moving direction feature value of the object. Furthermore, the image processing unit 1 includes, as functions thereof, a binarization process unit which extracts a binary area from the obtained image and a run length data creation process unit which creates run length data of the extracted binary area.

These process units are configured by the image processing unit 1 which executes a program previously implemented in the memory of the image processing unit 1. This program includes a vehicle surroundings monitoring program of the present invention. The program can be stored in the memory via a recording medium such as a CD-ROM. In addition, the program can be delivered or broadcasted from an external server over a network or a satellite and be stored in the memory after it is received from a communication device mounted on the vehicle 10.

The object extraction process unit 11 extracts an object existing around the vehicle 10 from the images taken by the infrared cameras 2R and 2L. More specifically, the object extraction process unit 11 binarizes a predetermined standard image (an image taken by the infrared camera 2R in this embodiment) in the images taken by the infrared cameras 2R and 2L by using the binarization process unit and then extracts a binary area in which the luminance value of a pixel in the standard image is equal to or higher than a predetermined threshold value. Furthermore, the object extraction process unit 11 creates run length data by the run length data creation process unit from the binary area and extracts the object based on the run length data by labeling or other processes.

The relative position detection process unit 16 searches the image taken by the infrared camera 2L for an object corresponding to the object extracted from the standard image by the object extraction process unit 11, detects a distance of the object with respect to the vehicle 10 based on a difference (parallax) between the objects in the images taken by two infrared cameras 2R and 2L, and converts the distance to real space coordinates to detect the relative position of the object with respect to the vehicle 10. A specific technique for detecting the relative position of the object based on the image can be, for example, the technique as disclosed in the above Patent Document 1.

The moving direction feature value calculation process unit 17 calculates the moving direction feature value representing the moving direction of the object relative to the vehicle 10 based on the time series of the relative position of the object detected by the relative position detection process unit 16. More specifically, the moving direction feature value calculation process unit 17 calculates the movement vector of the object relative to the vehicle 10 as the moving direction feature value from the time series data of the relative position of the object with respect to the vehicle 10. The calculation of the movement vector requires time series data for a predetermined period.

The pedestrian extraction process unit 12 extracts a pedestrian from the object extracted by the object extraction process unit 11. As for a method of extracting the pedestrian, there is used a method of determining whether the object is a pedestrian based on a feature representing the shape of the object such as, for example, an aspect ratio of the object or a ratio between the area of the object and the area of a rectangle circumscribing the object or based on a feature such as the size of the object or a luminance distribution in a grayscale image.

The posture determination process unit 13 defines the tilt of the trunk axis of the pedestrian extracted by the pedestrian extraction process unit 12 as a feature value representing the posture of the pedestrian and determines the degree of the tilt of the trunk axis. As for the method of calculating the trunk axis of the pedestrian, there is used, for example, a method of first creating run length data by the run length data creation process unit from a binary area, in which the luminance value of a pixel in the obtained image is equal to or higher than the predetermined threshold value, extracted by the binarization process unit and then calculating point sequence data consisting of pixel coordinates of midpoints of the respective lines of the created run length data to consider an approximate straight line approximate to the point sequence data as the trunk axis of the pedestrian. The determination process by the posture determination process unit 13 is performed sequentially (for each arithmetic processing period).

The object-to-be-avoided determination process unit 14 determines whether the object extracted by the object extraction process unit 11 is an object to be avoided which must be avoided from coming into contact with the vehicle 10. The determination algorithm executed by the object-to-be-avoided determination process unit 14 includes a first determination process on the posture of the pedestrian determined by the posture determination process unit 13 and a second determination process on the moving direction feature value of the object calculated by the moving direction feature value calculation process unit 17.

The vehicle equipment control process unit 15 calls the attention of the driver of the vehicle 10 to the object determined to be the object to be avoided by the object-to-be-avoided determination process unit 14. More specifically, the vehicle equipment control process unit 15 outputs a voice guide through the loudspeaker 6 or outputs, for example, an image taken by the infrared camera 2R to the display 7 to provide the driver of the vehicle 10 with the image including the object such as the pedestrian who is the object to be avoided being highlighted therein. The loudspeaker 6 and the display 7 correspond to the equipment controlled by the vehicle equipment control process unit according to the present invention.

Figure 3:
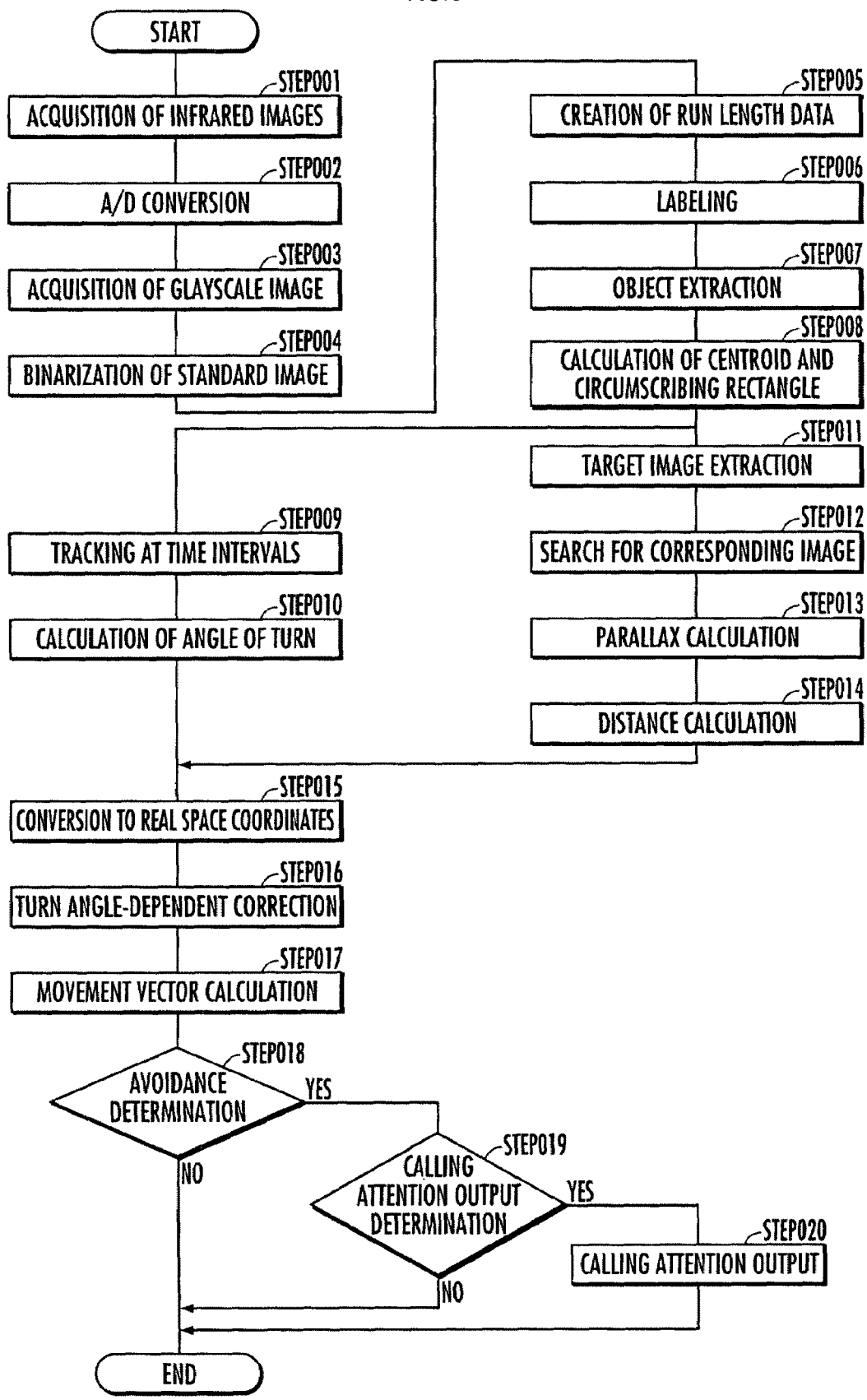
FIG. 3 is a flowchart showing an object detection and calling attention operation in the vehicle surroundings monitoring apparatus shown in FIG. 1.
Figure 4:
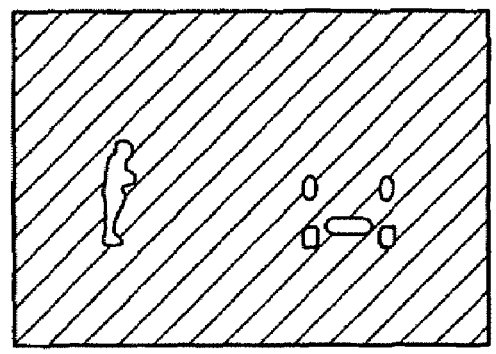
FIG. 4 is a diagram illustrating a processed image in the object detection and calling attention operation shown in FIG. 3.
Figure 4:
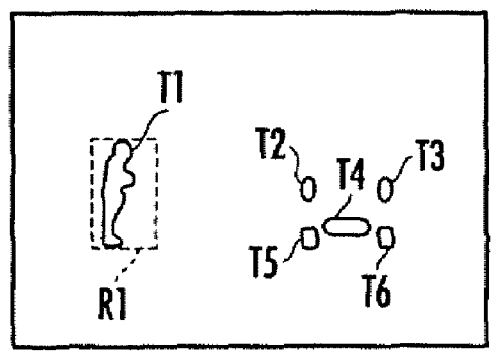
Figure 5:
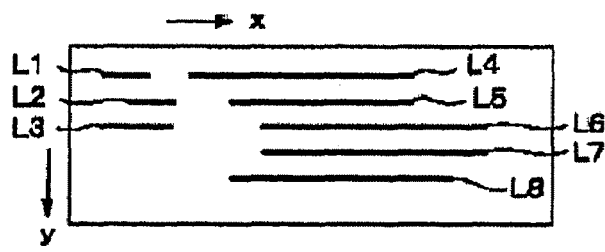
FIG. 5 is an explanatory diagram of processing for creating run length data and extracting an object in the object detection and calling attention operation shown in FIG. 3.
Figure 5:
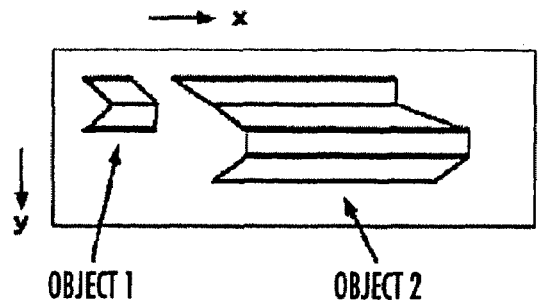

Subsequently, the general operation (object detection and calling attention operation) of the vehicle surroundings monitoring apparatus of this embodiment will be described with reference to the flowchart shown in FIG. 3. Referring to FIG. 3, the image processing unit 1 repeats the processing of step 001 to step 020 for each predetermined arithmetic processing period so as to perform the object detection and calling attention operation.

First, in step 001, the image processing unit 1 obtains infrared images which are the output signals of the infrared cameras 2R and 2L. Next, in step 002, the image processing unit 1 A/D-converts the image signal (analog signal) of each pixel of the captured infrared images. Next, in step 003, the image processing unit 1 stores the digital data (a grayscale image composed of pixel data) obtained by the A/D conversion into an image memory which is not shown. The right image is obtained by the infrared camera 2R and the left image is obtained by the infrared camera 2L. The horizontal (x direction) position in the image of the same object is different between the right image and the left image. Therefore, the distance up to the object can be calculated by the difference (parallax).

Next, in step 004, the image processing unit 1 binarizes the image signal of the standard image (the image taken by the infrared camera 2R in this embodiment) in the grayscale images. In other words, it sets a value of "1" (white) in the case where the luminance value of the pixel is a threshold value Ith or higher and sets "0" (black) otherwise for the standard image. The threshold value Ith is a value previously determined on an experimental basis.

Referring to FIG. 4(a), there is illustrated a binarized image from the image taken by the infrared camera 2R. In FIG. 4(a), a hatched area represents a black area and areas enclosed by thick solid lines represent white areas. The areas enclosed by the thick solid lines each have a high luminance level (high temperature) in the image taken by the infrared camera 2 and are areas of objects displayed in white on the screen. The example in FIG. 4(a) shows a situation where a pedestrian exists to the left ahead of the vehicle 10, another vehicle exists ahead of the vehicle 10, and a pedestrian is going to cross the road.

Next, in step 005, the image processing unit 1 creates run length data from the area (binary area) set to "white" by the binarization. With the binary area represented by a set of lines which are one-dimensional connected pixels in the horizontal direction of the image, the created run length data represents each of the lines constituting the binary area by the coordinates of the starting point of the line and the length (the number of pixels) of the line from the starting point to the end point.

Giving description with reference to FIG. 5(a) here, FIG. 5(a) shows the binary area represented by lines L1 to L8 which are one-dimensional connected pixels. Although the lines L1 to L8 each have a width of one pixel in the y direction (vertical direction) and are actually arranged leaving no space between each other in the y direction, they are shown as spaced apart from each other for clarity of description. Furthermore, the lines L1 to L8 have respective lengths of two pixels, two pixels, three pixels, eight pixels, seven pixels, eight pixels, eight pixels, and eight pixels in the x direction (horizontal direction). The run length data represents each of the lines L1 to L8 by the coordinates of the starting point (the left endpoint of each line) and the length (the number of pixels) from the starting point to the end point (the right endpoint of each line). For example, the line L3 is formed of three pixels (x3, y5), (x4, y5), and (x5, y5) and therefore represented by run length data (x3, y5, 3).

Next, in step 006, the image processing unit 1 performs labeling of the object based on the created run length data. Then, in step 007, the image processing unit 1 extracts the object based on the appended label. Specifically, lines overlapping in the vertical direction (y direction) of the image among the lines represented by the run length data are regarded as one object and a label (identifier) is appended to the object, by which the connected area in the image is extracted as the object. Giving description with reference to FIG. 5(b), in the lines L1 to L8 shown in FIG. 5(a), the lines L1 to L3 overlapping in the y direction are regarded as one object 1 and the lines L4 to L8 overlapping in the y direction are regarded as one object 2, whereby object labels 1 and 2 are appended to the run length data. This enables the extraction of the objects 1 and 2 from the binary area. In the above processing of steps 005 to 007, objects (binary objects) T1 to T6 are extracted as shown in FIG. 4(b) from the binary area shown in FIG. 4(a). In this condition, for example, the object with label T1 is represented by n run length data L1 to Ln. The extracted objects (binary objects) include, for example, another vehicle and artificial structures such as a utility pole and a vending machine as well as pedestrians in the vicinity of the road. In the instance shown in FIG. 4(b), the object T1 is a binary object corresponding to a pedestrian existing to the left ahead of the vehicle 10, and the objects T2 to T6 are binary objects corresponding to another vehicle existing ahead of the vehicle 10.

Next, in step 008, the image processing unit 1 calculates the area S and centroid G of the extracted object and the aspect ratio ASPECT of the rectangle circumscribing the object. More specifically, the area S of the object T1 is calculated by integrating the lengths of the lines each represented by run length data Li (i=1, - - -, n) with respect to n run length data of the object T1. The coordinates of the centroid G of the object T1 are each calculated by multiplying the length of the line indicated by each run length data Li by each of the coordinates (x[i], y[i]) of the midpoint of the line of the run length data Li, integrating the results of the multiplication with respect to the n run length data of the object T1, and dividing the result of the integration by the area S. The aspect ratio ASPECT of the object T1 is calculated as ratio Dy/Dx of length Dy in the vertical direction to length Dx in the horizontal direction of the rectangle circumscribing the object T1.

Next, in step 009, the image processing unit 1 tracks objects at time intervals, that is, recognizes identical objects for each operation period of the image processing unit 1. In the tracking at time intervals, assuming that an object A is extracted in the process of step 007 at time (discrete time) k in a certain arithmetic processing period and an object B is extracted in the process of step 007 at time k+1 in the next arithmetic processing period, the identity between the objects A and B is determined. The identity is determined, for example, based on the centroid G, the area S, and the aspect ratio ASPECT of each of the objects A and B. In the case where the objects A and B are determined to be identical to each other, the label of the object B extracted at time k+1 is changed to the same label as the object A. The tracking at time intervals is performed for the binarized standard image.

Next, in step 010, the image processing unit 1 reads the vehicle speed VCAR detected by the vehicle speed sensor 4 and the yaw rate YR detected by the yaw rate sensor 3 and integrates the yaw rate YR over time to calculate the angle of turn θr of the vehicle 10.

On the other hand, in steps 011 to 014, a distance z between the object and the vehicle 10 (the distance in the anteroposterior direction of the vehicle 10) is calculated in parallel with the processing of steps 009 and 010. This calculation requires a longer time period than the processing of steps 009 and 010, and hence it is executed in a longer period than that of the processing of steps 009 and 010 (for example, approximately three times as long as the period of execution of the processing of steps 001 to 010).

First, in step 011, the image processing unit 1 extracts a target image R1 (the entire area enclosed by the rectangle circumscribing the object is assumed to be the target image) from the standard image by selecting one of the objects tracked by the binary image of the standard image.

Next, in step 012, the image processing unit 1 sets a search area for searching for an image (hereinafter, referred to as "corresponding image") corresponding to the target image R1 within the reference image (the image other than the standard image in the right image and the left image taken by the infrared cameras 2R and 2L) and extracts the corresponding image by performing a correlation operation. More specifically, the image processing unit 1 sets a search area R2 within the reference image based on the coordinates of each vertex of the target image R1 and sets a local area R3 having the same shape as the target image R1 with coordinates (x0, y0) as a base point (the vertex at the upper left of the area) in the search area R2. It then moves the local area R3 within the search area R2 by changing the coordinates (x0, y0) of the base point, while calculating the sum of absolute differences (SAD), namely C(x0, y0) of the luminance value indicating the degree of correlation between the local area R3 and the target image R1 by the following equation (1):

[Eq. 1]

$$C(x0, y0) = \sum_{n=0}^{N-1} \sum_{m=0}^{M-1} |IL(x0 + m, y0 + n) - IR(m, n)| \quad (1)$$

In the above, the sum of absolute differences C(x0, y0) is obtained by taking an absolute value of a difference between a luminance value IR of a pixel of coordinates (m, n) in the target image R1 and a luminance value IL of a pixel of coordinates (x0+m, y0+n) in the local area R3 with the coordinates (x0, y0) in the search area R2 as the base point and calculating the summation value of the absolute values of the difference with respect to the all pixels (m=0, - - -, M−1, n=0, - - -, N−1) in the target image R1 and in the local area R3. A smaller value of the sum of absolute differences C(x0, y0) indicates a higher degree of correlation between the target image R1 and the local area R3. Accordingly, the coordinates (x0, y0) of the base point minimizing the sum of absolute differences C(x0, y0) is obtained to thereby extract the local area R3 at this location as the corresponding image R4. The correlation operation is performed by using grayscale images, instead of binary images. In the processing of steps 011 and 012, the target image R1 in the standard image and the corresponding image R4 in the reference image are extracted.

Next, in step 013, the image processing unit 1 calculates a parallax Δd (the number of pixels) based on the position of the centroid of the target image R1 and the position of the centroid of the corresponding image R4. Thereafter, the image processing unit 1 calculates the distance z between the vehicle 10 and the object using the calculated parallax Δd by the following equation (2) (step 014):

$$z = B \times F / (\Delta d \times p) \quad (2)$$

where B is the base length (a distance between the optical axes) of the infrared cameras 2R and 2L, F is the focal distance of lenses of the infrared cameras 2R and 2L, and p is a space interval between pixels.

After completion of the processing of step 010 and step 014, the image processing unit 1 converts the coordinates (x, y) and the distance z in the image to real space coordinates in step 015 to calculate the real space position which is the position in the real space of the object (the relative position to the vehicle 10). Note here that the real space position is in the position (X, Y, Z) in the real space coordinate system (XYZ coordinate system) which is set with the midpoint (position fixed on the vehicle 10) of mounting positions at which the infrared cameras 2R and 2L are mounted being defined as the origin of the real space coordinate system, as shown in FIG. 2. The X direction and the Y direction of the real space coordinate system are the horizontal direction (vehicle width direction) and the vertical direction of the vehicle 10, respectively. The X direction and the Y direction are the same as the x direction (horizontal direction) and the y direction (vertical direction) of the right image and the left image, respectively. The Z direction of the real space coordinate system is the anteroposterior direction of the vehicle 10. The real space position (X, Y, Z) is calculated by the following equations (3), (4), and (5), respectively:

$$X = x \times z \times p / f \quad (3)$$

$$Y = y \times z \times p / f \quad (4)$$

$$Z = z \quad (5)$$

Next, in step 016, the image processing unit 1 corrects the real space position of the object by using the angle of turn θr calculated in step 010 in order to increase the accuracy of the real space position of the object by compensating for the effect of the change in the angle of turn of the vehicle 10. The turn angle-dependent correction is processing for correcting a displacement of the image in the x direction, which occurs in the images taken by the infrared cameras 2R and 2L, for example, when the vehicle 10 turns to the left by the angle of turn θr during the period from time k to time (k+1). In the following description, the term "real space position of the object" means a real space position of the object to which the turn angle-dependent correction has already been applied.

Next, in step 017, the image processing unit 1 determines a movement vector of the object relative to the vehicle 10. Specifically, it determines a straight line approximate to time series data over a predetermined period (the period from the current time to a time the predetermined period of time earlier) of the real space position of an identical object and then determines a vector from the position of the object on the straight line at the time the predetermined period of time earlier (coordinates Pv1=(Xv1, Yv1, Zv1)) toward the position of the object on the straight line at the current time (coordinates Pv0=(Xv0, Yv0, Zv0)) as the movement vector of the object. Note here that the technique disclosed in Patent Document 1 described above is used for the specific calculation processing of the approximate straight line. In cases where the movement vector cannot be calculated due to a lack of the time series data of the real space position of the object because the predetermined arithmetic processing period has not been elapsed after the object is detected in this processing, the control proceeds to step 018 directly.

Next, in step 018, the image processing unit 1 performs an avoidance determination process in which it is determined whether the detected object is an object to be avoided (an object that should avoid contact with the vehicle 10). The avoidance determination process will be described in detail later. In the case where the detected object is determined not to be the object to be avoided in step 018 (in the case where the determination result is NO in step 018), the image processing unit 1 returns to step 001 to repeat the above processing. In the case where the detected object is determined to be the object to be avoided (in the case where the determination result is YES in step 018), the control proceeds to a calling attention output determination process in step 019.

In step 019, the image processing unit 1 performs the calling attention output determination process of determining whether to actually call attention to the object. In this calling attention output determination process, it is checked that the driver is carrying out a brake operation of the vehicle 10 on the basis of an output BR of the brake sensor 5 and it is determined that the calling attention should not be performed in the case where the deceleration (positive in the decelerating direction of the vehicle speed) of the vehicle 10 is larger than a predetermined threshold value (>0). In the case where the driver is not carrying out the brake operation or in the case where the deceleration of the vehicle 10 is equal to or lower than the predetermined threshold value though the driver is carrying out the brake operation, the image processing unit 1 determines that the calling attention should be performed.

In the case where the image processing unit 1 determines that the calling attention should be performed (in the case where the determination result is YES in step 019), it proceeds to step 020 to perform a calling attention output process in which the calling attention is performed for the driver of the vehicle 10 through the loudspeaker 6 and the display 7 and then returns to step 001 to repeat the above processing. The calling attention output process will be described in detail later. In the case where it is determined that the calling attention should not be performed in step 019 (in the case where it is determined that the calling attention should not be performed for all objects), the determination result is NO in step 019. In this case, the image processing unit 1 returns to step 001 directly to repeat the above processing.

The above is the object detection and calling attention operation of the image processing unit 1 of the vehicle surroundings monitoring apparatus according to this embodiment. This enables the detection of the objects such as a pedestrian and the like ahead of the vehicle 10 and calling driver's attention to the object to be avoided on the basis of the infrared images of the surroundings of the vehicle 10 and the signals indicating the running condition of the vehicle 10.

In this embodiment, steps 004 to 008 correspond to the object extraction process unit 11; steps 011 to 016 correspond to the relative position detection process unit 16; step 017 corresponds to the moving direction feature value calculation process unit 17; step 018 corresponds to the pedestrian extraction process unit 12, the posture determination process unit 13, and the object-to-be-avoided determination process unit 14; and steps 019 and 020 correspond to the vehicle equipment control process unit 15. Furthermore, step 004 corresponds to the binarization process unit and step 005 corresponds to the run length data creation process unit. Still further, the processing of steps 004 to 008 corresponds to the object extraction step in the vehicle surroundings monitoring method according to the present invention; the processing of step 018 corresponds to the pedestrian extraction step, the posture determination step, and the object-to-be-avoided determination step; and the processing of steps 019 and 020 corresponds to the vehicle equipment control step.

Figure 6:
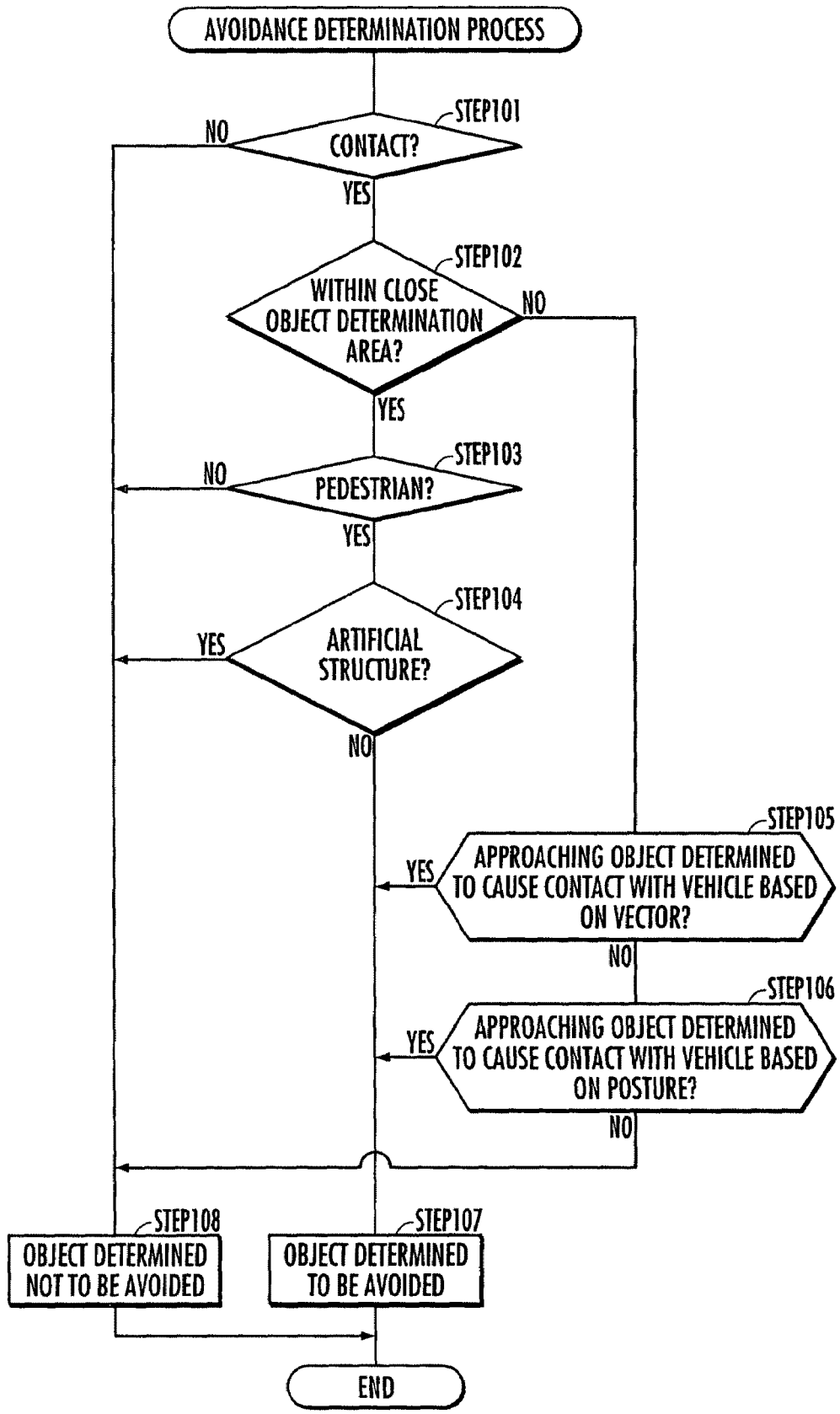
FIG. 6 is a flowchart of an avoidance determination process in the object detection and calling attention operation shown in FIG. 3.

The following describes the avoidance determination process in step 018 of the flowchart shown in FIG. 3 in detail with reference to the flowchart shown in FIG. 6. The avoidance determination process is performed to determine whether the object is the object to be avoided by determining the possibility of contact between the detected object and the vehicle 10 and the type of the object through a contact determination process, a determination process of whether the object is within a close object determination area, an approaching object contact determination process (based on a movement vector or a posture), a pedestrian determination process, and an artificial structure determination process described below.

Referring to FIG. 6, the image processing unit 1 performs the contact determination process as one of the processes of determining the degree of possibility that the object comes in contact with the vehicle 10 in step 101, first. The contact determination is a process to calculate a relative speed Vs in the Z direction between the object and the vehicle 10 to thereby determine whether there is a possibility of contact between them within allowance time T assuming that they each have an H or lower height and move constantly at a relative speed Vs. More specifically, in the case where the current coordinate value (distance) Zv0 in the Z direction of the object is equal to or less than Vs×T and the coordinate value (height) Yv0 in the Y direction of the object is equal to or less than H, it is determined that there is a possibility of contact between the object and the vehicle 10.

Figure 7:
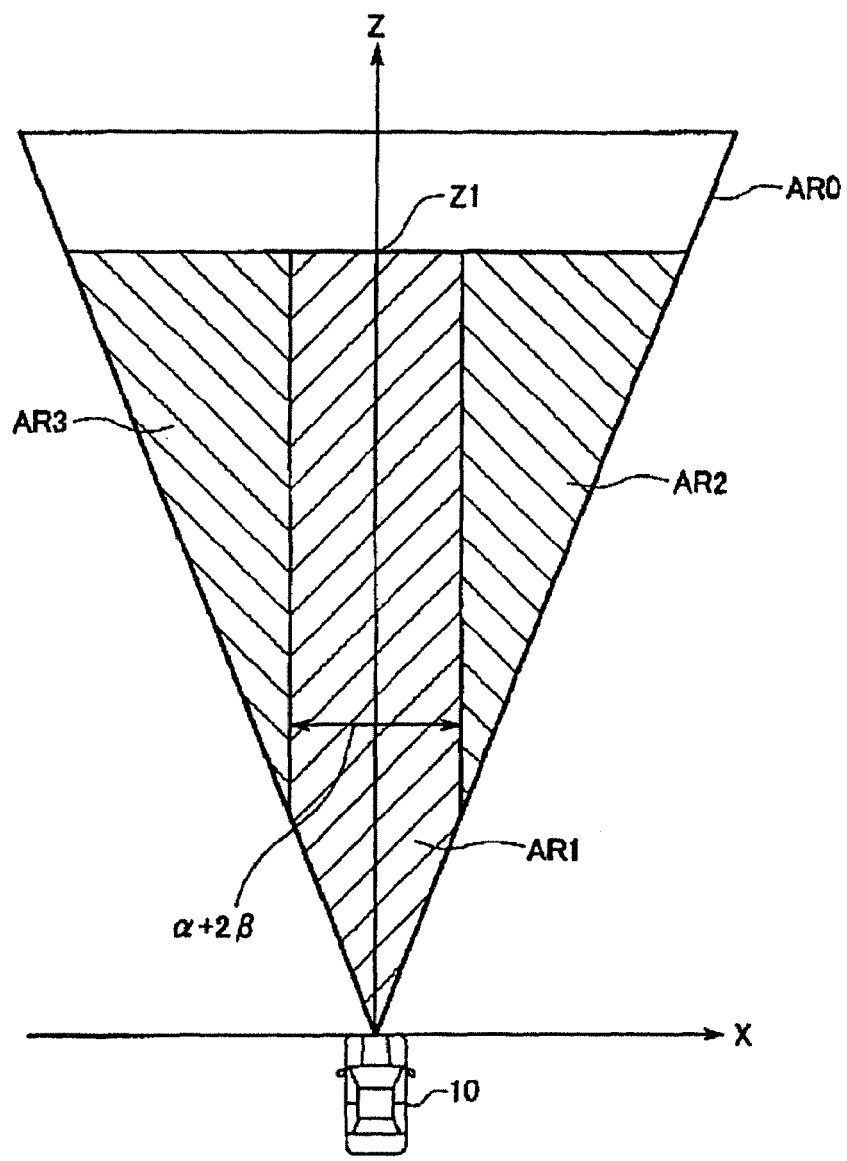
FIG. 7 is an explanatory diagram showing area sections ahead of the vehicle in the avoidance determination process shown in FIG. 6.
Figure 8:
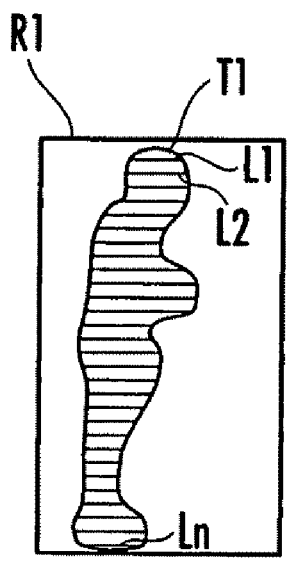
FIG. 8 is an explanatory diagram of processing for determining the posture of a pedestrian in the avoidance determination process shown in FIG. 6.
Figure 8:
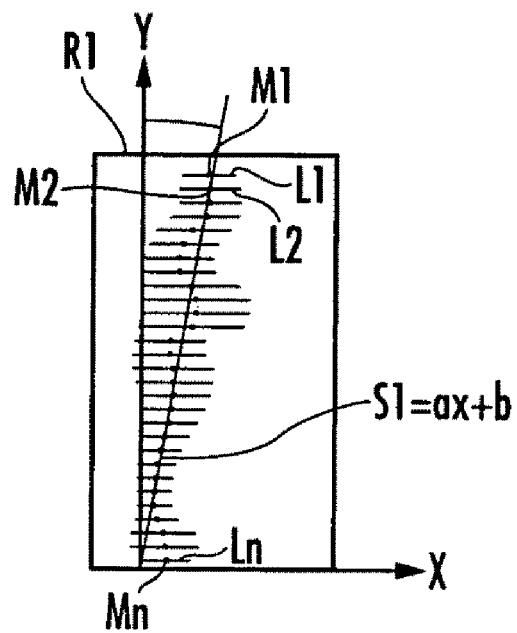

Referring to FIG. 7, there is shown a diagram of a road on which the vehicle 10 is traveling viewed from the above, with the illustration of the area section ahead of the vehicle 10. As shown in FIG. 7, assuming that the outside triangular area AR0 enclosed by a thick solid line is the area that can be monitored by the infrared cameras 2R and 2L, the area closer to the vehicle 10 than Z1 (=Vs×T) in the area AR0 is an area where there is a possibility of contact between the object and the vehicle 10. The height H is a predetermined height that defines the range in the height direction: for example, it is set to twice or so of the vehicle height of the vehicle 10. In the case where the determination result is NO in step 101 (in the case where there is no possibility of contact between the object and the vehicle 10 within the allowance time T), it means a situation where the contact between the object and the vehicle 10 can be avoided well in advance by steering and brake operation of the vehicle 10. In this instance, the control proceeds to step 108, where the image processing unit 1 determines that the object is not an object to be avoided and terminates the avoidance determination process.

In the case where the determination result is YES in step 101 (there is a possibility of contact between the object and the vehicle 10 within the allowance time T), the control proceeds to step 102, where the image processing unit 1 performs a process of determining whether the object exists within the close object determination area AR1 as one of processes to determine the degree of possibility that the object will come in contact with the vehicle 10. The close object determination area AR1 is an area having a width ($\alpha+2\beta$), which is the width $\alpha$ of the vehicle 10 plus allowances $\beta$ provided on both sides of the vehicle 10, in the area closer to the vehicle 10 than Z1 within the above area AR0 as shown in FIG. 7. The close object determination area AR1 has the predetermined height H, too.

In the case where the determination result is YES in step 102 (in the case where the object exists within the close object determination area AR1), the object is likely to come in contact with the vehicle 10 assuming that the object continues to be at the current real space position. In this instance, the control proceeds to step 103, where the image processing unit 1 performs a pedestrian determination process to determine whether the object is likely to be a pedestrian. The pedestrian determination process is performed to determine whether the object is a pedestrian from features such as the shape, size, luminance distribution in the grayscale image or the like of the object. A specific technique for the pedestrian determination process can be, for example, the technique as disclosed in Japanese Patent Laid-Open No. 2003-284057 by the present applicant.

In the case where the determination result is YES in step 103 (in the case where the object is likely to be a pedestrian), the control proceeds to step 104, where the image processing unit 1 performs an artificial structure determination process to determine whether the object is an artificial structure in order to increase the reliability of the determination on the possibility that the object is a pedestrian. The artificial structure determination process is a process of determining that the object is an artificial structure and excepting the object from the targets of calling attention in the case of detection of a feature indicating that the object is not a pedestrian such as, for example, a shape coincident with that of an artificial structure previously registered in the object image.

In the case where the determination result is NO in step 104 (in the case where the object is not an artificial structure), the control proceeds to step 107, where the image processing unit 1 determines that the object is the object to be avoided and terminates the avoidance determination process. Therefore, in the case where the object exists in the close object determination area AR1, there is a high possibility that the object is a pedestrian, and the object is determined not to be an artificial structure, then the object is determined to be avoided.

In addition, in the case where the determination result is NO in step 103 (there is no possibility that the object is a pedestrian) or the determination result is YES in step 104 (in the case where the object is an artificial structure), the control proceeds to step 108, where the image processing unit 1 determines that the object is not the object to be avoided and terminates the avoidance determination process.

On the other hand, in the case where the determination result is NO in step 102 (the object does not exist in the close object determination area AR1), the control proceeds to step 105, where the image processing unit 1 performs the approaching object contact determination process to determine whether there is a possibility that the object may enter the close object determination area AR1 and come in contact with the vehicle 10 (steps 105 and 106). As shown in FIG. 7, areas AR2 and AR3 (laterally outward of the close object determination area AR1) each having a larger absolute value of the X coordinate than the close object determination area AR1 within the area AR0 are defined here as approaching object determination areas. The approaching object contact determination process is a process of determining whether an object in the approaching object determination area AR2 or AR3 will enter the close object determination area AR1 by moving and come in contact with the vehicle 10. The approaching object determination areas AR2 and AR3 each have a predetermined height H, too.

First, in step 105, the image processing unit 1 performs the approaching object contact determination process based on the movement vector of the object. The approaching object contact determination process based on the movement vector corresponds to the second determination process of the determination algorithm executed by the object-to-be-avoided determination process unit according to the present invention. Furthermore, the second requirement for determining that the object is to be avoided (likely to come in contact with the vehicle 10) is that the object moving direction is toward the vehicle 10. More specifically, in the case where the X coordinate (the position in the vehicle width direction) of the intersection point between the XY plane (the plane perpendicular to the anteroposterior direction of the vehicle 10) in the front face of the vehicle 10 and the straight line including the movement vector of the object exists within a predetermined range slightly wider than the vehicle width $\alpha$ of the vehicle 10 (the object is relatively moving toward the vehicle 10), the image processing unit 1 determines that the object is likely to come in contact with the vehicle 10. In the case where the movement vector cannot be calculated in step 017, the determination result is NO in step 105.

In the case where the determination result is YES in step 105, the object is likely to come in contact with the vehicle 10 hereafter. Therefore, in this case, the control proceeds to step 108, where the image processing unit 1 determines that the object is the object to be avoided and terminates the avoidance determination process.

In the case where the determination result is NO in step 105, the control proceeds to step 106, where the image processing unit 1 performs the approaching object contact determination process based on a posture. The approaching object contact determination process based on the posture corresponds to the first determination process of the determination algorithm executed by the object-to-be-avoided determination process unit. A first requirement for determining that the object is the object to be avoided (there is a high possibility of contact) is that the object is a pedestrian and the pedestrian is leaning forward toward the center of the lane in which the vehicle 10 is traveling. The approaching object contact determination process based on the posture will be described in detail later. In the case where the determination result is YES in step 106, the object is likely to come in contact with the vehicle 10 hereafter. Therefore, in this case, the control proceeds to step 107, where the image processing unit 1 determines that the object is the object to be avoided and terminates the avoidance determination process. In the case where the determination result is NO in step 106, the object is unlikely to come in contact with the vehicle 10. Therefore, the control proceeds to step 108, where the image processing unit 1 determines that the object is not the object to be avoided and terminates the avoidance determination process.

The above is the detail of the avoidance determination process.

The following describes in detail the calling attention output process in step 020 of the flowchart shown in FIG. 3. In the calling attention output process, the display 7 displays the standard image, with the image of the object to be avoided in the standard image being highlighted. Furthermore, the loudspeaker 6 informs the driver of the existence of the object to be avoided with a voice guide. This calls the driver's attention to the object to be avoided. Calling the driver's attention can be performed through only one of the loudspeaker 6 and the display 7.

In this process, the image processing unit 1 calls the driver's attention in different modes between the case where the determination result is YES in step 105 and thereby the object is determined to be avoided (hereinafter, referred to as case 1) and the case where the determination result is YES in step 106 and thereby the object is determined to be avoided (hereinafter, referred to as case 2) in the avoidance determination process in the above step 018. Specifically, for example, when the object to be avoided is highlighted with a frame in the image of the display 7, different colors are used between case 1 and case 2; a lighter color than case 1 is used for case 2; or a thinner frame than case 1 is used for case 2. Furthermore, when providing the voice guide via the loudspeaker 6, the image processing unit 1 uses a different guide sentence pattern for the voice guide between case 1 and case 2 or uses a different voice type (for example, a frequency) of the voice guide between case 1 and case 2. Alternatively, both of the voice guide via the loudspeaker 6 and the highlighting on the display 7 are provided in case 1, while only the highlighting on the display 7 is performed in case 2. This enables more appropriate calling attention so that the driver can grasp the difference between the cases in the reliability of the determination result of the object to be avoided or in the emergency level of avoidance.

The above is the detail of the calling attention output process.

Then, the following describes in detail the approaching object contact determination process based on the posture in step 106 of the flowchart shown in FIG. 6. The approaching object contact determination process based on the posture is performed to determine, in the case a pedestrian as the object in the approaching object determination area AR2 or AR3, whether the pedestrian is an object to be avoided (whether there is a possibility of contact with the vehicle 10) by predicting the behaviors of the pedestrian on the basis of the posture of the pedestrian (the posture with respect to the tilt of the trunk axis of the pedestrian). The following description will be made by using the instance shown in FIG. 4(a) (the case where a pedestrian exists to the left ahead of the vehicle 10, another vehicle exists ahead of the vehicle 10, and a pedestrian is going to cross the road).

In step 106, the pedestrian extraction process unit 12 extracts the pedestrian from detected objects, first. In this process, in the case where the aspect ratio ASPECT of the object and a ratio SA/SB between the area SA of the object and the area SB of the rectangle circumscribing the object are each within a predetermined range, the image processing unit 1 determines that the object is a pedestrian and the object is extracted as a pedestrian. The predetermined range is previously determined as a value where the object corresponds to the pedestrian's upper body or whole body. Thereby, as shown in FIG. 4(b), the object T1 enclosed by the frame R1 is extracted as a pedestrian from the objects T1 to T6. In the case where no pedestrian is extracted, the determination result is NO in step 106. In the pedestrian extraction process, it is also possible to use another technique such as, for example, one used in the pedestrian determination process in step 103.

Subsequently, in the case where the pedestrian is extracted, the posture determination process unit 13 performs the process of determining the posture of the extracted pedestrian T1. The following description will be made with reference to FIGS. 8(a) and 8(b). FIGS. 8(a) and 8(b) each show an area enclosed by the frame R1 (including the pedestrian T1) shown in FIG. 4(b).

First, the posture determination process unit 13 calculates the trunk axis of the pedestrian T1. Specifically, the posture determination process unit 13 calculates point sequence data P_T1, which consists of pixel coordinates of midpoints of the lines represented by the run length data Li from the run length data L1 to Ln of the extracted pedestrian T1, first. Referring to FIG. 8(a), a binary area corresponding to the object extracted as the pedestrian T1 is represented by n run length data L1 to Ln as shown. FIG. 8(b) shows the run length data L1 to Ln and the midpoints M1 to Mn thereof are as shown. The point sequence data P_T1 consists of coordinate data {(X1, Y1)}, (X2, Y2), - - -, (Xn, Yn)} of the midpoints M1 to Mn. In FIG. 8(b), the coordinate axes X and Y are set as shown. In this situation, the X axis is parallel to the horizontal direction of the vehicle 10 and the Y axis is the vertical axis in the image.

Subsequently, the posture determination process unit 13 calculates an approximate straight line S1 approximate to the calculated point sequence data P_T1. In this calculation, the least squares method is used for the approximation. Thereby, the approximate straight line S1=aX+b is calculated as shown in FIG. 8(b). The approximate straight line S1 corresponds to the trunk axis of the pedestrian T1.

Thereafter, the posture determination process unit 13 determines the degree of the tilt of the trunk axis of the pedestrian T1 based on the approximate straight line S1 calculated. More specifically, in this embodiment, the posture determination process unit 13 determines whether the trunk axis of the pedestrian T1 is leaning forward toward the center of the lane in which the vehicle 10 is traveling (whether the pedestrian T1 is leaning forward to head for the lane in which the vehicle 10 is traveling). First, as shown in FIG. 8(b), the posture determination process unit 13 calculates an angle $\theta=\tan^{-1}$ between the approximate straight line S1 and the vertical axis Y. Subsequently, the posture determination process unit 13 determines whether the trunk axis of the pedestrian T1 is leaning forward toward the center of the lane in which the vehicle 10 is traveling based on the angle $\theta$. In this embodiment, the angle $\theta$ is set in such a way that the vertical axis Y is aligned with the 0 degree orientation and the angular orientation in a direction from the vertical axis Y toward the center of the lane in which the vehicle 10 is traveling is positive (the clockwise direction is positive in the instance shown in FIG. 8(b)).

In the case where the angle $\theta$ is equal to or more than a threshold value $\theta1$ and equal to or less than a threshold value $\theta2$ $(0<\theta1<\theta2)$, it is determined that the pedestrian is leaning forward toward the lane in which the vehicle 10 is traveling. The threshold values $\theta1$ and $\theta2$ are previously determined as values each indicating the range of an angle of the trunk axis generally formed in the moving direction when the pedestrian is moving. A behavior of the pedestrian T1 such as crossing the road is previously and rapidly predicted on the basis of the result of determining the posture of the pedestrian T1. In the instance shown in FIG. 8(b), the relation $\theta1\leq\theta\leq\theta2$ is satisfied and it is determined that the pedestrian T1 is leaning forward toward the lane in which the vehicle 10 is traveling. Thereby, it is predicted that the pedestrian T1 is going to cross the road.

Subsequently, the object-to-be-avoided determination process unit 14 determines whether the pedestrian T1 is an object to be avoided on the basis of the determination result of the posture of the pedestrian T1 obtained by the posture determination process unit 13. In the case where the pedestrian T1 is, for example, leaning forward toward the lane in which the vehicle 10 is traveling (the determination result is YES in step 106) in this process, it is predicted that the pedestrian T1 is going to cross the road and therefore the object is determined to be avoided in step 107. Therefore, for example, in the case where the pedestrian T1 existing in the approaching object determination area AR2 or AR3 suddenly runs into the road, the image processing unit 1 rapidly performs the calling attention output determination and the calling attention output of steps 019 and 020 shown in FIG. 3.

According to this embodiment, the above processing enables rapid determination of the pedestrian to be avoided among the pedestrians existing around the vehicle 10 based on the images taken by the infrared cameras 2R and 2L and calling the attention of the driver of the vehicle 10.

Second Embodiment

Subsequently, a second embodiment of the present invention will be described. This embodiment differs from the first embodiment only in the operations of the posture determination process unit 13 and the object-to-be-avoided determination process unit 14 which are functions of the image processing unit 1, while the functional block diagram of the vehicle surroundings monitoring apparatus in this embodiment is the same as in FIG. 1. In the description below, the same reference numerals designate the same components as in the first embodiment and their description is omitted here.

In the vehicle surroundings monitoring apparatus of this embodiment, the posture determination process unit 13, which is a function of the image processing unit 1, determines a degree of symmetry of the pedestrian extracted by the pedestrian extraction process unit 12 in the horizontal direction of the vehicle 10 in the image with the symmetry considered as a feature value representing the posture of the pedestrian. As for the method of calculating the symmetry of the pedestrian in the horizontal direction of the vehicle 10 in the image, there is used, for example, a method of calculating the symmetry by a correlation operation between the right area and the left area after setting the head area of the pedestrian on the basis of the luminance distribution in the grayscale image and setting the right area and the left area with the head area as a standard. The features other than those described above are the same as those of the first embodiment.

Subsequently, the description will be given to the entire operation (object detection and calling attention operation) of the vehicle surroundings monitoring apparatus according to this embodiment. The object detection and calling attention operation of the vehicle surroundings monitoring processing in this embodiment differs from the first embodiment only in the process of performing approaching object contact determination by determining the posture of the pedestrian in the avoidance determination process (step 106 in FIG. 6). The flowchart of the avoidance determination process in this embodiment is the same as in FIG. 6. Therefore, the following description will be made with reference to the flowchart shown in FIG. 6. The following description is made by using the instance shown in FIG. 4(a) (where the pedestrian exists to the left ahead of the vehicle 10, another vehicle exists ahead of the vehicle 10, and the pedestrian is going to cross the road) similarly to the first embodiment.

In step 106, first, the pedestrian extraction process unit 12 extracts a pedestrian from detected objects in the same manner as for the first embodiment. Thereby, as shown in FIG. 4(b), an object T1 enclosed by a frame R1 is extracted as a pedestrian from objects T1 to T6. In the case where no pedestrian is extracted, the determination result is NO in step 106.

Figure 9:
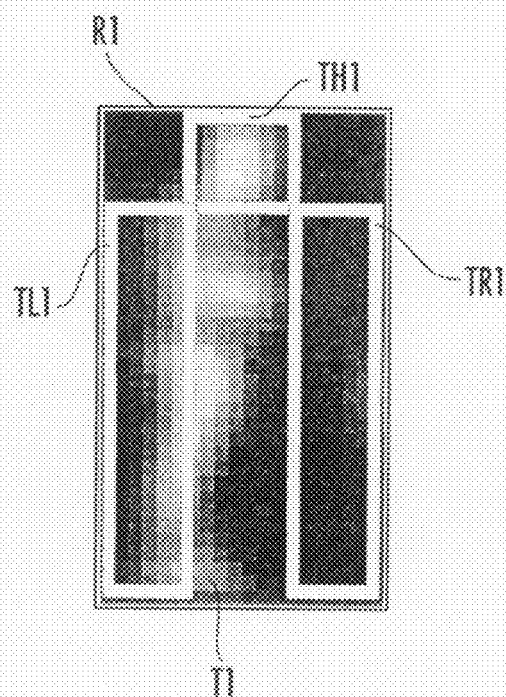
FIG. 9 is an explanatory diagram of processing for determining the posture of the pedestrian in the avoidance determination process of a second embodiment of the present invention.

In the case where the pedestrian is then extracted, the posture determination process unit 13 determines the posture of the pedestrian T1 extracted. Hereinafter, the description will be made with reference to FIG. 9. FIG. 9 shows an area corresponding to the area (including the pedestrian T1) enclosed by the frame R1 shown in FIG. 4(b) in the grayscale image.

First, the posture determination process unit 13 calculates the symmetry of the pedestrian T1 in the horizontal direction of the vehicle 10 in the image. In this process, first, the posture determination process unit 13 sets head area TH1 of the pedestrian T1 extracted in the grayscale image. Specifically, the posture determination process unit 13 sets a projection area in the area corresponding to the extracted pedestrian T1 in the grayscale image and calculates a vertical luminance projection (a horizontal distribution of integrated luminance obtained by integrating the luminance levels of the respective pixels in the vertical direction) so as to detect the horizontal coordinate where the integrated luminance reaches the maximum peak in the grayscale image. Thereafter, the posture determination process unit 13 sets the area, which is estimated to correspond to the head position of the pedestrian T1, as the head area TH1 as shown in FIG. 9 around the detected horizontal coordinate.

Subsequently, the posture determination process unit 13 sets a right area TR1 and a left area TL1 on both right and left sides of the lower part than the head area TH1 in the area enclosed by the frame R1 as shown in FIG. 9. The right area TR1 and the left area TL1 are set in such a way as to include the pedestrian's right and left shoulders in the case where the anteroposterior direction of the vehicle 10 is the same as that of the pedestrian (in the case where the traveling direction of the vehicle 10 is substantially the same as the moving direction of the pedestrian). In the instance shown in FIG. 9, the moving direction of the pedestrian T1 is toward the right (toward the center of the lane) and therefore the right area TR1 is relatively close to the center of the lane.

The posture determination process unit 13 then calculates the sum of absolute differences of the luminance value indicating a degree of correlation between the mirror reversed image of the right area TR1 and the left area TL1. The sum of absolute differences indicates the degree of symmetry of the pedestrian T1 in the horizontal direction of the vehicle 10 in the image.

Thereafter, the posture determination process unit 13 determines the degree of symmetry of the pedestrian T1 in the horizontal direction of the vehicle 10 in the image on the basis of the calculated sum of absolute differences. More specifically, it is determined whether the degree of symmetry is low (whether the pedestrian T1 is leaning forward) in this embodiment. In the case where the calculated sum of absolute differences is equal to or greater than the predetermined value (the degree of correlation is low), the posture determination process unit 13 determines that the degree of symmetry is low. In the example shown in FIG. 9, the calculated sum of absolute differences is equal to or greater than the predetermined value and therefore the posture determination process unit 13 determines that the degree of symmetry is low. Thereby, it is understood that the pedestrian T1 is leaning forward toward the center of the lane or toward the opposite side.

Furthermore, in the case where it is determined that the degree of symmetry is low, the posture determination process unit 13 determines whether the pedestrian T1 is leaning forward toward the center of the lane on the basis of the luminance distributions in the right area TR1 and the left area TL1. For example, the posture determination process unit 13 calculates the average of the luminance values in the area TR1 and in the area TL1: in the case where the average in the area closer to the center of the lane is lower than the average in the opposite area, it is determined that the pedestrian T1 is leaning forward toward the center of the lane. In the instance shown in FIG. 9, the area closer to the center of the lane is the right area TR1, and the calculated average of the right area TR1 is smaller than the average of the left area TL1. Therefore, the pedestrian T1 is determined to be leaning forward toward the center of the lane in which the vehicle 10 is traveling. Thereby, it is predicted that the pedestrian T1 is going to cross the road.

Then, the object-to-be-avoided determination process unit 14 determines whether the pedestrian T1 is an object to be avoided on the basis of the determination result of the posture of the pedestrian T1 obtained by the posture determination process unit 13. In this instance, for example, in the case where the pedestrian T1 is leaning forward toward the center of the lane in which the vehicle 10 is traveling (in the case where the determination result is YES in step 106), it is predicted that the pedestrian T1 is going to cross the road, by which the object-to-be-avoided determination process unit 14 determines that the object is to be avoided in step 107. This enables rapid calling attention output determination and calling attention output processing in step 019 and step 020, for example, in the case where the pedestrian T1 existing in the approaching object determination area AR2 or AR3 suddenly runs into the road. The operations other than those described above are the same as in the first embodiment.

According to this embodiment, the above processing enables rapid determination of the pedestrian to be avoided among the pedestrians existing around the vehicle 10 based on the images taken by the infrared cameras 2R and 2L and provision of information to the driver of the vehicle 10 in the same manner as in the first embodiment.

While the image processing unit 1 has performed both of the approaching object contact determination process based on the movement vector of the object (step 105) and the approaching object contact determination process based on the posture of the pedestrian (step 106) as the approaching object contact determination process in the avoidance determination process in step 018 in the first and second embodiments, it is also possible to perform, for example, only the approaching object contact determination process based on the posture of the pedestrian (step 106) as the approaching object contact determination process in another embodiment.

Furthermore, the image processing unit 1 has called the attention of the driver of the vehicle 10 to the object determined to be avoided in step 018 in the first and second embodiments. For example, however, in the case where the vehicle 10 can operate one of a steering device, a braking device, and an acceleration device using an actuator (or in the case where the traveling behaviors of the vehicle 10 can be controlled), it is also possible to control the steering device, the braking device, or the acceleration device of the vehicle 10 in such a way as to prevent the contact with the object determined to be avoided in step 018 or to facilitate the avoidance in another embodiment.

For example, the acceleration device is controlled in such a way that the driver's necessary force on the acceleration pedal is larger than that in the case where there is no object to be avoided (normal condition) to thereby reduce the acceleration. Alternatively, a required torque of a steering wheel toward the heading direction of the steering device, which is required to avoid the contact between the object to be avoided and the vehicle 10, is set lower than the required torque of the steering wheel toward the opposite side so as to facilitate the steering wheel operation toward the heading direction. Alternatively, the increasing speed of a braking force of the vehicle 10 depending on the depressing amount of a brake pedal of the braking device is set higher than the normal condition. This facilitates the driving of the vehicle 10 to avoid from coming into contact with the object to be avoided.

In the case of controlling the steering device, the acceleration device, or the braking device of the vehicle 10 as described above, these devices correspond to the equipment to be controlled by the vehicle equipment control process unit in the present invention. In addition, it is possible to perform the control of the steering device and the calling attention through the display 7 or the loudspeaker 6 described above in parallel with each other.

Moreover, while the infrared cameras have been used as cameras in the first and second embodiments, it is also possible to use, for example, normal CCD cameras or the like that can detect only visible light. It should be noted, however, that the process of extracting a pedestrian, a traveling vehicle or the like can be simplified by using the infrared cameras, by which the present invention can be realized by using an arithmetic unit whose arithmetic capacity is relatively low.

What is claimed is:

1. A vehicle surroundings monitoring apparatus which monitors the surroundings of a vehicle from an image taken by a camera mounted on the vehicle, comprising:

an object extraction process unit which extracts an object existing around the vehicle from the image taken by the camera;

a pedestrian extraction process unit which extracts a pedestrian from the object extracted by the object extraction process unit;

a posture determination process unit which determines the posture of the pedestrian extracted by the pedestrian extraction process unit;

an object-to-be-avoided determination process unit which determines whether the object extracted by the object extraction process unit is an object to be avoided which must be avoided from coming into contact with the vehicle by executing a determination algorithm including at least a first determination process on the posture of the pedestrian determined by the posture determination process unit; and a vehicle equipment control process unit which controls equipment of the vehicle at least according to a determination result of the object-to-be-avoided determination process unit.

2. The vehicle surroundings monitoring apparatus according to claim 1, wherein the equipment controlled by the vehicle equipment control process unit includes a device capable of calling attention of a driver of the vehicle.

3. The vehicle surroundings monitoring apparatus according to claim 1, wherein the equipment controlled by the vehicle equipment control process unit includes a device capable of controlling traveling behaviors of the vehicle.

4. The vehicle surroundings monitoring apparatus according to claim 1, further comprising:

a relative position detection process unit which sequentially detects relative positions of the object extracted by the object extraction process unit to the vehicle; and a moving direction feature value calculation process unit which calculates a moving direction feature value representing a moving direction of the object relative to the vehicle based on the time series of the relative position of the object detected by the relative position detection process unit at longer time intervals than the execution period of the determination process of the posture determination process unit, wherein the determination algorithm which is executed by the object-to-be-avoided determination process unit includes a second determination process on the moving direction feature value of the object calculated by the moving direction feature value calculation process unit as well as the first determination process; the first determination process is performed to determine whether the posture of the pedestrian satisfies a predetermined first requirement; and the second determination process is performed to determine whether the moving direction feature value of the object satisfies a predetermined second requirement, and wherein the object-to-be-avoided determination process unit determines that the object is the object to be avoided when the determination result of the second determination process on the moving direction feature value of the object satisfies the second requirement or when the determination result of the second determination process does not satisfy the second requirement and further the determination result of the first determination process on the posture of the pedestrian satisfies the first requirement.

5. The vehicle surroundings monitoring apparatus according to claim 1, wherein the vehicle equipment control process unit controls the vehicle equipment in different modes between when the determination result of the second determination process on the moving direction feature value of the object satisfies the second requirement and when the determination result of the second determination process does not satisfy the second requirement and further the determination result of the first determination process on the posture of the pedestrian satisfies the first requirement.

6. The vehicle surroundings monitoring apparatus according to claim 1, wherein the posture determination process unit determines a degree of symmetry of the pedestrian in the vehicle width direction in the image with the symmetry considered as a feature value representing the posture of the pedestrian.

7. The vehicle surroundings monitoring apparatus according to claim 1, wherein the posture determination process unit determines a degree of tilt of a trunk axis of the pedestrian with the tilt of the trunk axis considered as a feature value representing the posture of the pedestrian.

8. The vehicle surroundings monitoring apparatus according to claim 1, further comprising:

a binarization process unit which extracts a binary area, in which a luminance value of a pixel in the image is equal to or higher than a predetermined threshold value, by binarizing the image taken by the camera; and a run length data creation process unit which creates run length data of the binary area extracted by the binarization process unit, wherein the object extraction process unit extracts objects existing around the road based on the run length data created by the run length data creation process unit, and wherein the posture determination process unit determines the posture of the pedestrian extracted by the pedestrian extraction process unit based on the run length data created by the run length data creation process unit.

9. The vehicle surroundings monitoring apparatus according to claim 8, wherein the posture determination process unit includes: a process unit which calculates point sequence data consisting of pixel coordinates of midpoints of respective lines of the run length data from the run length data created by the run length data creation process unit; a process unit which calculates an approximate straight line approximate to the calculated point sequence data; and a process unit which determines the posture of the pedestrian based on the calculated approximate straight line.

10. The vehicle surroundings monitoring apparatus according to claim 9, wherein the posture determination process unit determines the posture of the pedestrian based on an angle between the approximate straight line and a vertical axis in the image.

11. A vehicle surroundings monitoring apparatus having a computer including an interface circuit for accessing data of an image taken by a camera mounted on a vehicle, the apparatus monitoring the surroundings of the vehicle by arithmetic processing with the computer, wherein the computer performs:

an object extraction process of extracting objects existing around the vehicle from the image taken by the camera;

a pedestrian extraction process of extracting a pedestrian from the objects extracted in the object extraction process;

a posture determination process of determining the posture of the pedestrian extracted in the pedestrian extraction process;

an object-to-be-avoided determination process of determining whether the object extracted in the object extraction process is an object to be avoided which must be avoided from coming into contact with the vehicle by executing a determination algorithm including at least a first determination process on the posture of the pedestrian determined in the posture determination process; and a vehicle equipment control process of controlling equipment of the vehicle at least according to a determination result of the object-to-be-avoided determination process.

12. A vehicle surroundings monitoring method for monitoring the surroundings of a vehicle from an image taken by a camera mounted on the vehicle, comprising:

an object extraction step of extracting an object existing around the vehicle from the image taken by the camera;

a pedestrian extraction step of extracting a pedestrian from the object extracted in the object extraction step;

a posture determination step of determining the posture of the pedestrian extracted in the pedestrian extraction step;

an object-to-be-avoided determination step of determining whether the object extracted in the object extraction step is an object to be avoided which must be avoided from coming into contact with the vehicle by executing a determination algorithm including at least a first determination process on the posture of the pedestrian determined in the posture determination step; and a vehicle equipment control step of controlling equipment of the vehicle at least according to a determination result of the object-to-be-avoided determination step.

13. A vehicle surroundings monitoring program for causing a computer to perform processing of monitoring the surroundings of a vehicle from an image taken by a camera mounted on the vehicle, the program causing the computer to perform:

an object extraction process of extracting an object existing around the vehicle from the image taken by the camera;

a pedestrian extraction process of extracting a pedestrian from the object extracted in the object extraction process;

a posture determination process of determining the posture of the pedestrian extracted in the pedestrian extraction process;

an object-to-be-avoided determination process of determining whether the object extracted in the object extraction process is an object to be avoided which must be avoided from coming into contact with the vehicle by executing a determination algorithm including at least a first determination process on the posture of the pedestrian determined in the posture determination process; and a vehicle equipment control process of controlling equipment of the vehicle at least according to a determination result of the object-to-be-avoided determination process.

* * * * *